(12) United States Patent  
Meyer et al.

(10) Patent No.: US 10,630,507 B2  
(45) Date of Patent: Apr. 21, 2020

(54) SYSTEM FOR AND METHOD OF ESTABLISHING A CONNECTION BETWEEN A FIRST ELECTRONIC DEVICE AND A SECOND ELECTRONIC DEVICE

(71) Applicant: ALE INTERNATIONAL, Colombes (FR)

(72) Inventors: Philippe Meyer, Geispolsheim (FR); Nicolas Pfleger, Strasbourg (FR); François Olivier, Plobsheim (FR)

(73) Assignee: ALE INTERNATIONAL, Colombes (FR)

( * ) Notice: Subject to any disclaimer, the term of this patent is extended or adjusted under 35 U.S.C. 154(b) by 623 days.

(21) Appl. No.: 15/363,592

(22) Filed: Nov. 29, 2016

(65) Prior Publication Data

US 2018/0152320 A1 May 31, 2018

(51) Int. Cl.
*H04L 12/46* (2006.01)
*H04L 12/741* (2013.01)
(Continued)

(52) U.S. Cl.
CPC ........ *H04L 12/4641* (2013.01); *H04L 41/046* (2013.01); *H04L 41/0806* (2013.01);
(Continued)

(58) Field of Classification Search
CPC . H04L 12/4641; H04L 61/2007; H04L 67/26; H04L 67/141; H04L 41/0806;
(Continued)

(56) References Cited

U.S. PATENT DOCUMENTS 9,479,433 B1 * 10/2016 Lewis ..................... H04L 45/50
2001/0020273 A1 * 9/2001 Murakawa .......... H04L 63/0272
726/15
(Continued)

FOREIGN PATENT DOCUMENTS

EP        1998506 A1    12/2008
WO    2009029774 A1     3/2009

OTHER PUBLICATIONS

European Search Report with regard to the counterpart application No. 17020548.8 completed on Feb. 27, 2018.

*Primary Examiner* — David R Lazaro  
*Assistant Examiner* — Berhanu Shitayewoldetadik  
(74) *Attorney, Agent, or Firm* — BCF LLP

(57) ABSTRACT

Methods of and systems for establishing a packet connection between a first application running on a first electronic device located within a local area network (LAN) and a second application running on a second electronic device located outside the LAN. The method comprises: sending, by a messaging client located outside the LAN, a request message to establish a virtual private network (VPN); receiving, by a messaging agent located within the LAN, the request message; causing, by the messaging agent, a VPN client located within the LAN to negotiate, based on the request message, a VPN connection between the VPN client and a VPN server located outside the LAN; assigning, by the VPN server, a network address; provisioning the VPN client with the network address; and commanding the second application to set up the packet connection to the first application based on the network address.

25 Claims, 7 Drawing Sheets

(51) Int. Cl.
  *H04L 29/08* (2006.01)
  *H04L 12/24* (2006.01)
  *H04L 29/06* (2006.01)
  *H04L 29/12* (2006.01)
(52) U.S. Cl.
  CPC .......... *H04L 45/54* (2013.01); *H04L 61/2007* (2013.01); *H04L 63/0272* (2013.01); *H04L 67/141* (2013.01); *H04L 67/26* (2013.01); *H04L 61/256* (2013.01); *H04L 61/2514* (2013.01); *H04L 61/2592* (2013.01); *H04L 61/3015* (2013.01)
(58) Field of Classification Search
  CPC ... H04L 41/046; H04L 45/54; H04L 63/0272; H04L 61/2514; H04L 61/3015; H04L 61/2592; H04L 61/256
  USPC .......................................................... 709/224
  See application file for complete search history.

(56) References Cited

U.S. PATENT DOCUMENTS

| | | | | |
|---|---|---|---|---|
| 2002/0159465 A1* | 10/2002 | Watanuki | H04L 29/06 | 370/401 |
| 2003/0002496 A1* | 1/2003 | Beier | H04L 29/12301 | 370/389 |
| 2003/0182431 A1* | 9/2003 | Sturniolo | G06F 15/16 | 709/227 |
| 2004/0095932 A1* | 5/2004 | Astarabadi | H04L 29/1216 | 370/389 |
| 2004/0098485 A1* | 5/2004 | Larson | H04L 29/12066 | 709/227 |
| 2004/0268121 A1* | 12/2004 | Shelest | H04L 63/0272 | 713/156 |
| 2005/0210150 A1* | 9/2005 | Bahl | H04L 29/12066 | 709/245 |
| 2005/0226254 A1* | 10/2005 | Vimpari | H04L 29/06027 | 370/395.52 |
| 2006/0067271 A1* | 3/2006 | Chen | H04L 63/0272 | 370/331 |
| 2007/0237115 A1* | 10/2007 | Bae | H04L 12/2834 | 370/331 |
| 2008/0022391 A1* | 1/2008 | Sax | H04L 12/4679 | 726/15 |
| 2008/0198858 A1* | 8/2008 | Townsley | H04L 12/4641 | 370/401 |
| 2008/0288647 A1* | 11/2008 | Gbadegesin | H04L 29/12009 | 709/228 |
| 2008/0301303 A1* | 12/2008 | Matsuoka | H04L 12/4645 | 709/227 |
| 2010/0037311 A1* | 2/2010 | He | H04L 63/0209 | 726/15 |
| 2010/0046473 A1* | 2/2010 | Kozakai | H04W 36/34 | 370/331 |
| 2010/0046474 A1* | 2/2010 | Kozakai | H04W 36/14 | 370/331 |
| 2010/0260172 A1* | 10/2010 | Bodin | H04L 65/1043 | 370/355 |
| 2011/0125898 A1* | 5/2011 | Hassan | H04L 67/14 | 709/225 |
| 2012/0113977 A1* | 5/2012 | Shimoosawa | H04L 12/4641 | 370/352 |
| 2012/0124660 A1* | 5/2012 | Wang | H04L 12/4641 | 726/12 |
| 2013/0136130 A1* | 5/2013 | Tanimoto | H04L 12/462 | 370/392 |
| 2013/0227291 A1* | 8/2013 | Ahmed | H04L 63/0281 | 713/171 |
| 2014/0007220 A1 | 1/2014 | Pepin | | |
| 2015/0007272 A1* | 1/2015 | Zou | H04L 63/10 | 726/4 |
| 2015/0254726 A1* | 9/2015 | Cassidy | G06Q 30/0269 | 705/14.58 |
| 2015/0350342 A1* | 12/2015 | Thrpe | H04L 41/12 | 709/219 |
| 2016/0307170 A1* | 10/2016 | Harkey | G06Q 20/02 | |
| 2017/0005829 A1* | 1/2017 | Kouno | H04L 12/4633 | |

* cited by examiner

SYSTEM FOR AND METHOD OF ESTABLISHING A CONNECTION BETWEEN A FIRST ELECTRONIC DEVICE AND A SECOND ELECTRONIC DEVICE

FIELD

The present technology relates to systems and methods of establishing a connection between a first electronic device and a second electronic device. In particular, the systems and methods allow establishing a packet connection between a first application running on a first electronic device and a second application running on a second electronic device.

BACKGROUND

Telecommunication products typically require that technical tasks, such as installation, administration and/or monitoring be reduced to the simplest and minimal possible. This is typically achieved by designing telecommunication products which may be operated remotely thereby avoiding sending technicians at premises where a given telecommunication product is installed. As an example, remotely operated telecommunication products (also referred to as "PBX") may allow technicians to perform some or all operations from a remote central technique center, also referred to as a remote service center (also referred to as "RSC"). Access to the one or more PBX by the RSC may be performed through remote connection capabilities that are embedded in the PBX themselves. As a PBX is typically installed within premises of an enterprise connected to a public switched telephone network (also referred to as "PSTN"), a technician may initiate a remote connection from a RSC to the PBX by setting up a modem call to one of direct inward lines (e.g., a public phone number) associated with the targeted enterprise. The PBX, by answering the modem call, then allows a data connection to be established. The data connection allows installation, administration and/or monitoring of the PBX from the RSC, by one or more technicians, without requiring the one or more technicians to be located in a premise where the PBX is physically installed.

Over the last decade, telecommunication operators have followed a trend of replacing PSTN accesses with pure Internet Protocol (IP) technologies. Such IP technologies include, for example, initiation protocol (SIP) trunks. SIP trunks typically operate over an IP connection routed toward a telecommunication service provider through networking equipment. Such networking equipment includes, for example, Internet access router performing network address translation (NAT) and/or firewalling. This change from PSTN to pure IP technologies does often no longer allow modem calls. This may be at least partially explained by the fact that modem-like connections over SIP trunks may not be supported by telecommunication service providers.

In addition, as IP data traffic initiated from outside of a local area network (LAN) is typically blocked by security policies implemented by network equipment associated with the LAN, the RSC can no longer initiate a connection from outside the LAN to a PBX located in the LAN. Even though the PBX could be configured in such a way that it would accept a remote connection request, a technician installing the PBX in the LAN of a premise may not have the authority to make such modifications to the security policy of the LAN to which the PBX is connected. Even if such modifications were feasible, they could potentially create a security breach in the LAN of the premise where the PBX is installed.

Improvements may be therefore desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) a necessity to operate a security policy change of a network (such as a LAN) where the PBX is installed, (2) opening a security hole in the network where the PBX is installed by leaving a dedicated communication port opened and/or (3) no immediate access to the PBX by relying on a polling mechanism wherein the PBX periodically consults the RSC to check if a remote connection is requested by the RSC.

In one aspect, various implementations of the present technology provide a method of establishing a packet connection between a first application running on a first electronic device located within a local area network (LAN) and a second application running on a second electronic device located outside the LAN, the method comprising:
 sending, by a messaging client located outside the LAN, a request message to establish a virtual private network (VPN);
 receiving, by a messaging agent located within the LAN, the request message;
 causing, by the messaging agent, a VPN client located within the LAN to negotiate, based on the request message, a VPN connection between the VPN client and a VPN server located outside the LAN;
 assigning, by the VPN server, a network address;
 provisioning the VPN client with the network address; and
 commanding the second application to set up the packet connection to the first application based on the network address.

In another aspect, the method further comprises, prior to commanding the second application to set up the packet connection to the first application based on the network address:
 receiving, by the messaging agent, a confirmation of an establishment of the VPN connection and the network address; and
 sending, by the messaging agent, to the messaging client the confirmation of the establishment of the VPN connection and the network address.

In yet another aspect, commanding the second application to set up the packet connection to the first application based on the network address is executed by the messaging client.

In another aspect, commanding the second application to set up the packet connection to the first application based on the network address comprises setting up, by the second application, the packet connection to the first application so as to communicate with the first application by sending packets to the network address.

In yet another aspect, the packets are routed by the VPN server to the VPN client.

In another aspect, the request message comprises at least one of an address of the VPN server, VPN credentials and VPN parameters.

In yet another aspect, the network address is from a domain associated with the second application.

In another aspect, the messaging agent comprises a messaging client and logic to initiate the connection by the VPN client to the VPN server based on the network address.

In yet another aspect, the messaging client and the messaging agent comprises instructions to operate a light weight messaging service allowing maintaining a communication path between the messaging client and the messaging agent.

In another aspect, the light weight messaging service is compliant with at least one of the extensible messaging and presence protocol (XMPP) and the session initiation protocol (SIP).

In yet another aspect, the first electronic device is connected to the second electronic device via a wide area network (WAN).

In another aspect, the first electronic device is a telecommunication product and the second electronic device is part of a remote service center remote from a premise wherein the first electronic device is located, the packet connection allowing the second application to conduct remote maintenance operations on the first application.

In yet another aspect, the messaging agent, the first application and the VPN client run on the first electronic device.

In another aspect, the packet connection is a TCP/IP connection and the network address is a virtual IP address.

In another aspect, various implementations of the present technology provide a method of establishing a packet connection between a first application running on a first electronic device located within a local area network (LAN) and a second application running on a second electronic device located outside the LAN, the method comprising:

receiving, by a messaging agent located within the LAN, a request message to establish a virtual private network (VPN);

causing, by the messaging agent, a VPN client located within the LAN to negotiate, based on the request message, a VPN connection between the VPN client and a VPN server located outside the LAN;

receiving, from the VPN server, a network address;

provisioning the VPN client with the network address; and establishing the packet connection between the first application and the second application based on the network address.

In another aspect, receiving, from the VPN server, the network address comprises:

receiving, by the messaging agent, a confirmation of an establishment of the VPN connection and the network address; and sending, by the messaging agent, to a messaging client located outside the LAN the confirmation of the establishment of the VPN connection and the network address.

In yet another aspect, the request message comprises at least one of an address of the VPN server, VPN credentials and VPN parameters.

In another aspect, the messaging agent comprises a messaging client and logic to initiate the connection by the VPN client to the VPN server based on the network address.

In yet another aspect, the messaging agent comprises instructions to operate a light weight messaging service allowing maintaining a communication path between the messaging client and the messaging agent.

In another aspect, the light weight messaging service is compliant with at least one of the extensible messaging and presence protocol (XMPP) and the session initiation protocol (SIP).

In yet another aspect, the messaging agent, the first application and the VPN client run on the first electronic device.

In another aspect, the packet connection is a TCP/IP connection and the network address is a virtual IP address.

In another aspect, various implementations of the present technology provide a method of establishing a packet connection between a first application running on a first electronic device located within a local area network (LAN) and a second application running on a second electronic device located outside the LAN, the method comprising:

sending, by a messaging client located outside the LAN, a request message to establish a virtual private network (VPN);

receiving a connection request to negotiate a VPN connection between a VPN client located within the LAN and a VPN server located outside the LAN, the connection request having been generated by the VPN client;

assigning, by the VPN server, a network address;

provisioning the VPN client with the network address; and commanding the second application to set up the packet connection to the first application based on the network address.

In yet another aspect, commanding the second application to set up the packet connection to the first application based on the network address is executed by the messaging client.

In another aspect, commanding the second application to set up the network connection to the first application based on the network address comprises setting up, by the second application, the packet connection to the first application so as to communicate with the first application by sending packets to the network address.

In yet another aspect, the method further comprises routing the packets by the VPN server to the VPN client.

In another aspect, the request message comprises at least one of an address of the VPN server, VPN credentials and VPN parameters.

In yet another aspect, the network address is from a domain associated with the second application.

In another aspect, the messaging client comprises instructions to operate a light weight messaging service compliant with at least one of the extensible messaging and presence protocol (XMPP) and the session initiation protocol (SIP).

In yet another aspect, the packet connection is a TCP/IP connection and the network address is a virtual IP address.

In another aspect, various implementations of the present technology provide a system for establishing a packet connection between a first application running on a first electronic device located within a local area network (LAN) and a second application running on a second electronic device located outside the LAN, the system comprising:

a processor;

a non-transitory computer-readable medium, the non-transitory computer-readable medium comprising control logic which, upon execution by the processor, causes:

receiving, by a messaging agent located within the LAN, a request message to establish a virtual private network (VPN);

causing, by the messaging agent, a VPN client located within the LAN to negotiate, based on the request message, a VPN connection between the VPN client and a VPN server located outside the LAN;

receiving, from the VPN server, a network address;

provisioning the VPN client with the network address; and establishing the packet connection between the first application and the second application based on the network address.

In yet another aspect, various implementations of the present technology provide a system for establishing a packet connection between a first application running on a first electronic device located within a local area network (LAN) and a second application running on a second electronic device located outside the LAN, the system comprising:

a processor;

a non-transitory computer-readable medium, the non-transitory computer-readable medium comprising control logic which, upon execution by the processor, causes:

sending, by a messaging client located outside the LAN, a request message to establish a virtual private network (VPN);

receiving a connection request to negotiate a VPN connection between a VPN client located within the LAN and a VPN server located outside the LAN, the connection request having been generated by the VPN client;

assigning, by the VPN server, a network address;

provisioning the VPN client with the network address; and commanding the second application to set up the packet connection to the first application based on the network address.

In other aspects, various implementations of the present technology provide a non-transitory computer-readable medium storing program instructions for establishing a connection between a first electronic device and a second electronic device, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for establishing a connection between a first electronic device and a second electronic device, the program instructions being executable by the at least one processor of the electronic device to carry out one or more of the above-recited methods.

In the context of the present specification, unless expressly provided otherwise, a computer system may refer, but is not limited to, an "electronic device", a "network device", a "telecommunication product", a "PBX", a "remote service center", a "RSC", a "network system", a "maintenance system", an "installation system", an "operation system", a "system", a "computer-based system" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
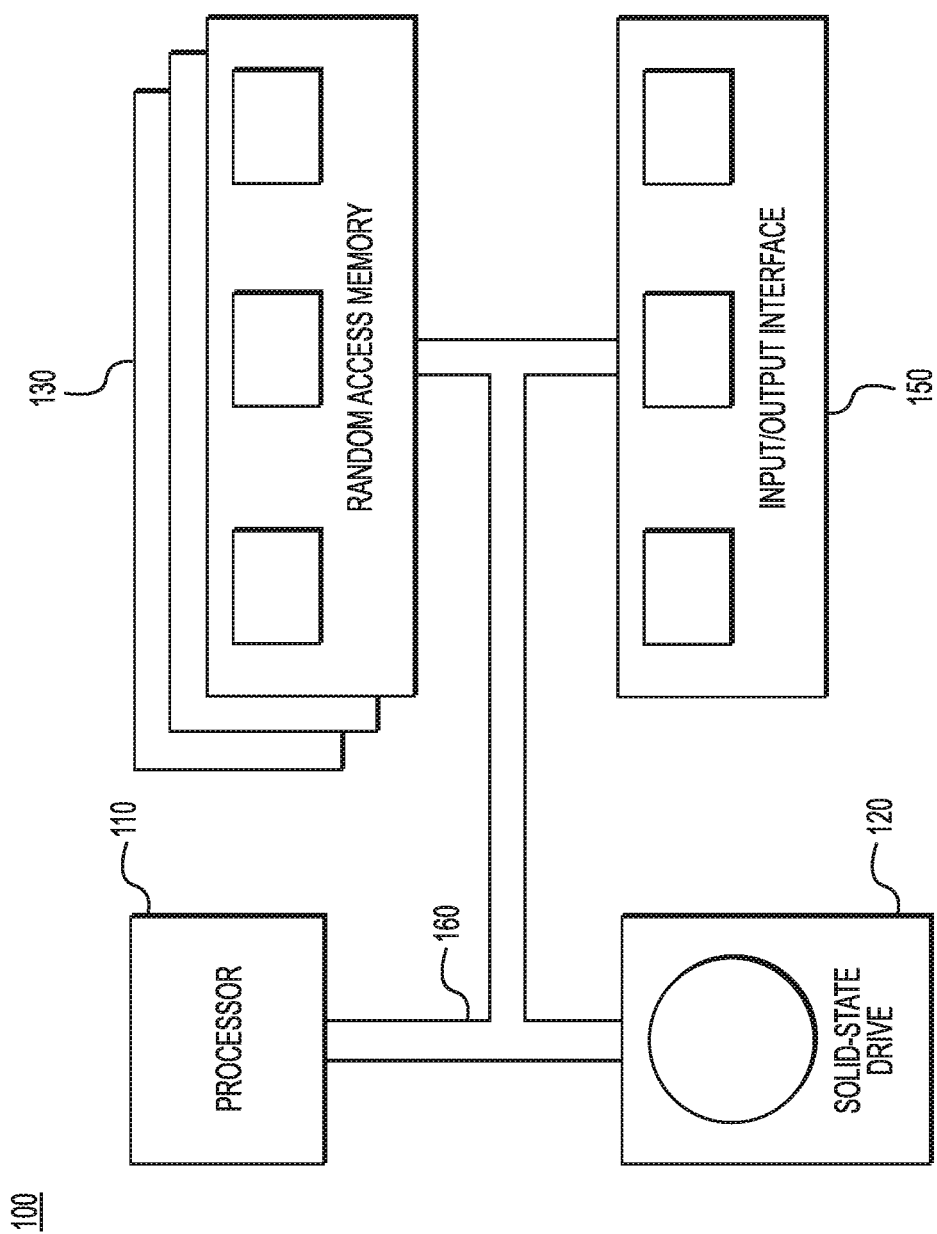
FIG. 1 is a diagram of a computing environment in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", an "application", a "messaging client", a "messaging agent", a "VPN client" or a "VPN server" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor", an "application", a "messaging client", a "messaging agent", a "VPN client" or a "VPN server" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of the telecommunication product, the messaging service and/or the remote service center illustrated in FIGS. 2 to 4. In some embodiments, the computing environment 100 comprises various hardware components including one or more single or multi-core processors collectively represented by a processor 110, a solid-state drive 120, a random access memory 130 and an input/output interface 150. The computing environment 100 may be a computer specifically designed for communications solutions and services such as, but not limited to, telecommunications, networking and/or cloud solutions. In some alternative embodiments, the computing environment 100 may be a generic computer system. The computing environment 100 may be an "electronic device", a "network device", a "telecommunication product", a "PBX", a "remote service center", a "RSC", a "network system", a "maintenance system", an "installation system", an "operation system", a "system", a "computer-based system" and/or any combination thereof appropriate to the relevant task at hand.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for establishing a packet connection between a first application running on a first electronic device and a second application running on a second electronic device. For example, the program instructions may be part of a library or an application.

Figure 2:
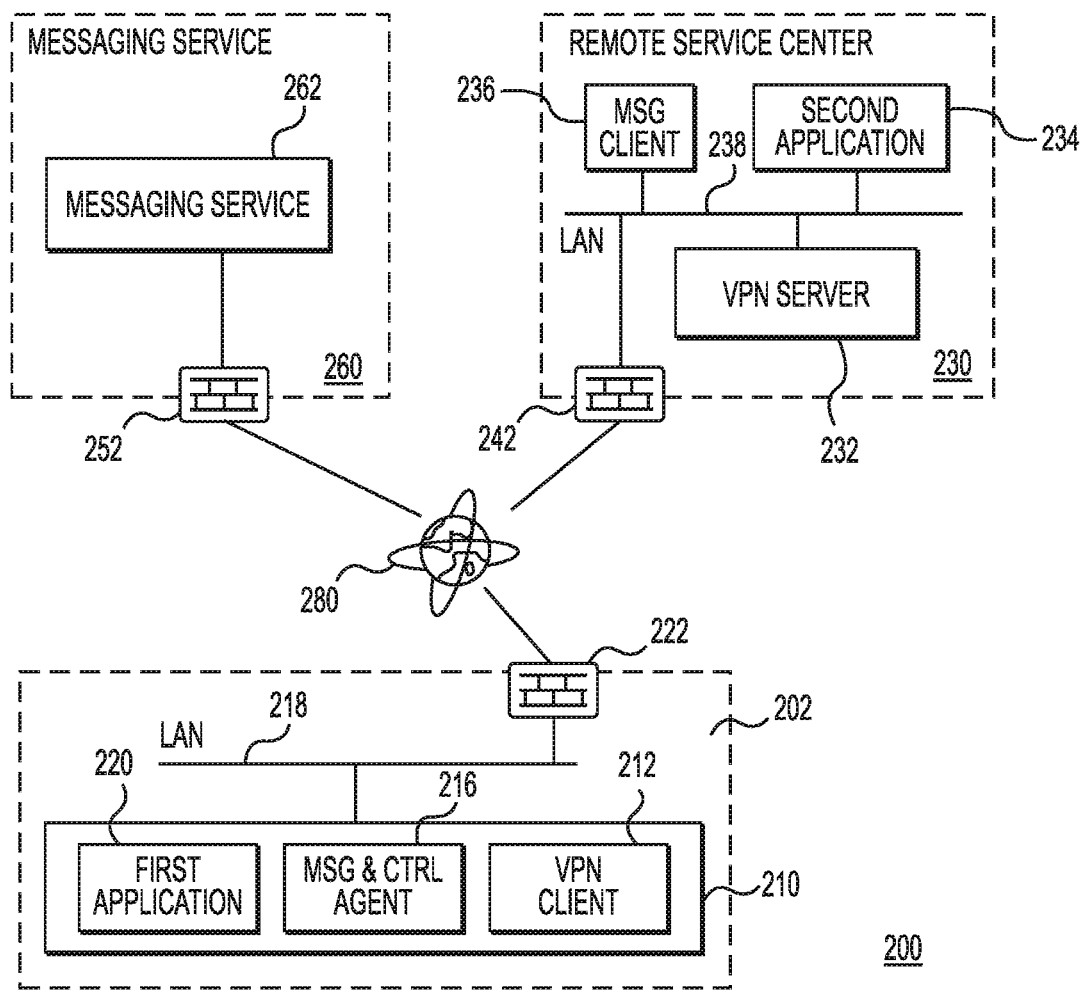
FIG. 2 is a diagram of a networked computing environment suitable for use with some implementations of the present technology.

In FIG. 2, there is shown a networked computing environment 200 suitable for use with some implementations of the present technology. The networked computing environment 200 comprises a telecommunication product 210, a remote service center 230 and a messaging service 260. In some embodiments, the telecommunication product 210 may also be referred to as a first electronic device 210 and the remote service center 230 may also be referred to as a second electronic device 230. The telecommunication product 210 and the remote service center 230 may each comprise hardware and/or software and/or firmware (or a combination thereof), as is known in the art, to execute establishing a packet connection between a first application running on the telecommunication product 210 and a second application running on the remote service center 230.

The telecommunication product 210 and the remote service center 230 are coupled to a communications network 280 via communication links. In some non-limiting embodiments of the present technology, the communications network 280 can be implemented as the Internet. In other embodiments of the present technology, the communications network 280 can be implemented differently, such as any wide-area communications network (WAN), local-area communications network (LAN), a private communications network or combinations thereof. In the illustrated embodiment, the communications network 280 comprises a first LAN 218 associated with the telecommunication product 210, the first LAN 218 being connected to the Internet via an Internet access gateway 222. The communications network 280 also comprises a second LAN 238 associated with the remote service center 230, the second LAN 238 being connected to the Internet via an Internet access gateway 242. In some embodiments, the Internet access gateway 222 and the Internet access gateway 242 comprise a network address translation (NAT) mechanism and a firewall to secure each of the first LAN 218 and the second LAN 238.

How the communication links of the communications network 280 are implemented is not particularly limited. Merely as an example and not as a limitation, the communication links can be either wireless (such as the Wireless Fidelity, or WiFi® for short, Bluetooth® or the like) or wired (such as an Ethernet based connection).

It should be expressly understood that implementations for the telecommunication product 210, the remote service center 230, the messaging service 260, the communication links and the communications network 280 are provided for illustration purposes only. As such, those skilled in the art will easily appreciate other specific implementational details for the telecommunication product 210, the remote service center 230, the messaging service 260, the communication links and the communications network 280.

In the illustrated embodiment, the telecommunication product 210 is represented as being installed at premises 202 (e.g., premises of an enterprise) and connected to the first LAN 218 which may be the private network of the enterprise. The telecommunication product 210 comprises a virtual private network (VPN) client 212, a messaging agent 216 and a first application 220. As it may be appreciated, in some non-limitative embodiments, the first application 220 may comprise a software application allowing installation, maintenance and/or operation of the telecommunication product 210 and/or other products connected to the first LAN 218. Other functions may also be executed by the first application 220 as it may become apparent to the person skilled in the art of the present technology. In some embodiments, the first application 220 may be executed by the telecommunication product itself. In some embodiments, the first application 220 may be the telecommunication product itself. In some embodiments, the first application 220 may be a maintenance application comprising functionalities relating to maintenance of telecommunication products as it may become apparent to the person skilled in the art of the present technology. In some alternative embodiments, the first application 220 may be executed on a different device than the telecommunication product 210 itself. The same may also apply to VPN client 212 and/or the messaging agent 216 which may be executed on a different device than the telecommunication product 210 itself. In some embodiments, the first application 220 and the VPN client 212 are executed on the telecommunication product 210 while the messaging agent 216 is executed on a different device than the telecommunication product 210.

The VPN client 212 may be a standard VPN client and may be configured so as to provide connections capabilities to a VPN server as it will become apparent to the person skilled in the art of the present technology. The messaging agent 216 may also be referred as a messaging and control agent or messaging client. In some embodiments, the messaging agent 216 comprises a messaging client and control logic allowing controlling the VPN client 212 so as to, for example, but not limited to, initiating a connection by the VPN client 212 to a VPN server. In some embodiments, the messaging agent 216 comprises instructions to operate a light weight messaging service allowing maintaining a communication path between the messaging client and the messaging agent. In some embodiments, the communication path is a permanent communication path. In some embodiments, the light weight messaging service is compliant with the extensible messaging and presence protocol (XMPP) and/or the session initiation protocol (SIP). Other protocols may also be used as it may become apparent to a person skilled in the art of the present technology.

In the illustrated embodiment, the remote service center 230 is installed outside the premises where the telecommunication product 210 is installed. In some embodiments, the remote service center 230 is a physical entity such as, but not limited to, a remote central technique center from which technicians may remotely execute operations on telecommunication products, such as the telecommunication product 210. In some embodiments, the operations executable by the technicians may comprise, but are not limited to, installing, maintaining and/or operations the telecommunication product 210. Multiple variations may also be envisioned and will become apparent to the person skilled in the art of the present technology. In some embodiments, the remote service center 230 may be connected to multiple telecommunication products located in different premises (e.g., located in different enterprises). In some embodiments, the remote service center 230 may comprise a single computing entity (e.g., a remote service server) or multiple computing entities (e.g., a cluster of servers). As a result, the remote service center 230 may refer to a single computing entity enabling the whole functions of the remote service center or only part thereof. In some other embodiments, the remote service center 230 may refer to multiple computing entities, each one of the computing entities implementing one or more of the functions of the remote service center.

In the embodiment depicted at FIG. 2, the remote service center 230 comprises a VPN server 232, a second application 234 and a messaging client 236. The VPN server 232 may be a standard VPN server and may be configured so as to provide connections capabilities to one or more VPN clients as it will become apparent to the person skilled in the art of the present technology. In some embodiments, the VPN server 232 may be implemented so as to be compliant with the Internet protocol security (IPsec) protocol. In some other embodiments, the VPN server 232 may be implemented so as to be compliant with other protocols as it may become apparent to the person skilled in the art of the present technology. In some embodiments, the second application 234 may also be referred to an application requesting access as this is the application for which a connection with the telecommunication product is to be established. In some embodiments, the second application 234 is configured to connect to the first application 220 in accordance with the present technology as it will be further detailed in the paragraphs below. Once connected to the first application 220, the second application 234 allows remotely installing, maintaining, operating and/or running application(s) of the telecommunication product 210. Even though the second application 234 is represented as a single application, it should be understood that the second application 234 may also refer to a plurality of applications coexisting on the remote service center 230.

In some embodiments, the messaging client 236 comprises a messaging client and control logic allowing sending a command to request opening a VPN connection to the VPN client 212 via the messaging service 260. In some embodiments, the command comprises parameters allowing the VPN client 212 to connect to the VPN server 232. As for the messaging agent 216, in some embodiments, the messaging client 236 comprises instructions to operate a light weight messaging service compliant with the extensible messaging and presence protocol (XMPP) and/or the session initiation protocol (SIP). Other protocols may also be used as it may become apparent to a person skilled in the art of the present technology.

As it may be appreciated by the person skilled in the art of the present technology, the VPN server 232, the second application 234 and the messaging client 236 may (but do not need to) run on a same computing entity. In some embodiments, the VPN server 232 may run on a first computing entity, the second application 234 may run on a second computing entity and the messaging client 236 may run on a third computing entity. In some embodiments, the first computing entity, the second computing entity and the third computing entity may be connected via the second LAN 238. Other configurations may equally be envisioned without departing from the scope of the present technology.

Also illustrated in FIG. 2 is the messaging service 260. As previously mentioned, the messaging service may be compliant with the extensible messaging and presence protocol (XMPP) and/or the session initiation protocol (SIP). Other protocols may also be used as it may become apparent to a person skilled in the art of the present technology. In some embodiments, the messaging service 260 may enabled by a messaging service server 262 connected to the communications network 280 via an Internet access gateway 252.

Figure 3:
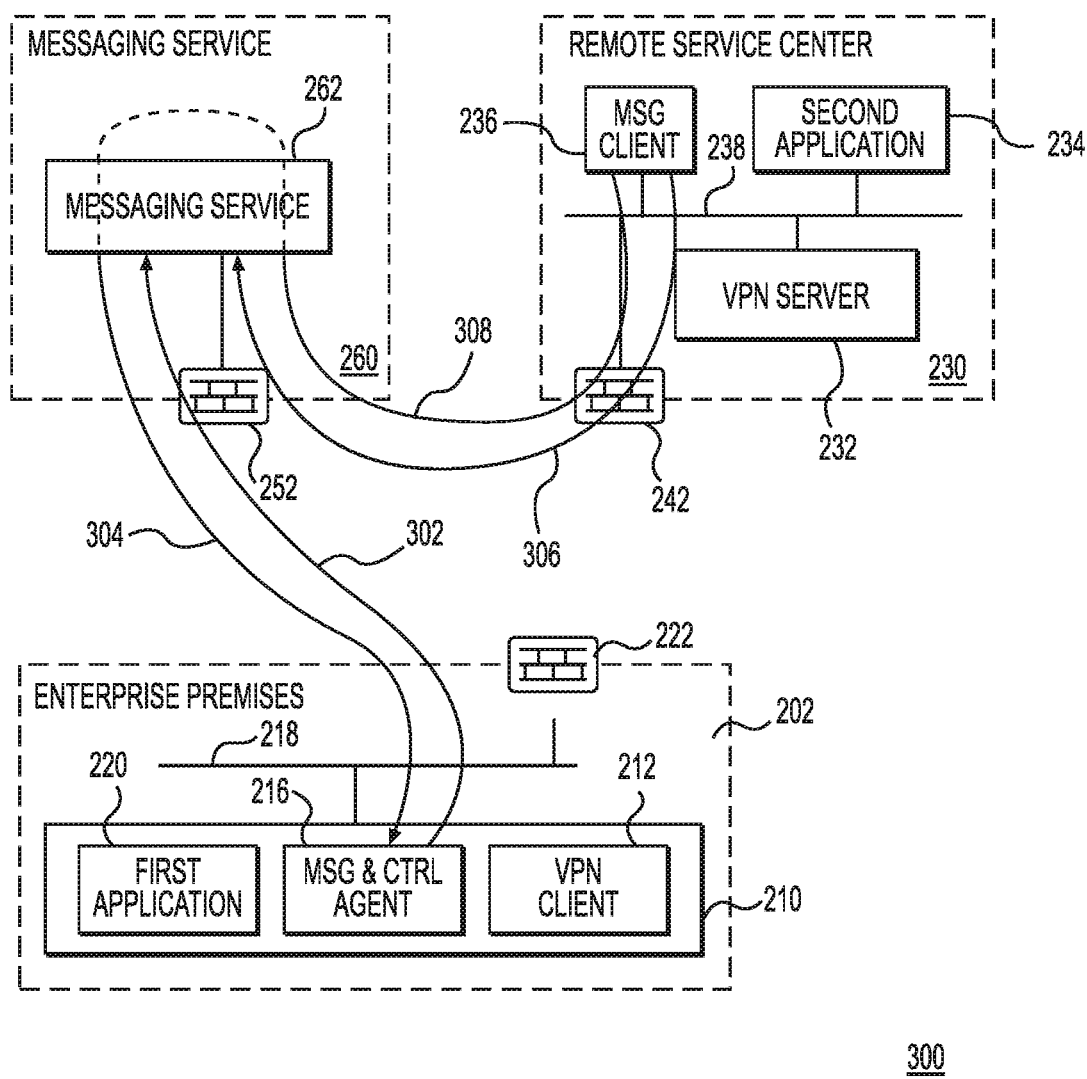
FIG. 3 is a diagram of preliminary configuration steps in accordance with an embodiment of the present technology.

Turning now to FIG. 3, an example of preliminary configuration steps 300 are illustrated. The preliminary configuration steps 300 may be executed by the telecommunication product 210 and the remote service center 230 before establishing a connection between the first application 220 running on the telecommunication product 210 and the second application 234 running on an electronic device of the remote service center 230. In the illustrated embodiment, the messaging agent 216 of the telecommunication product 210 may send a registration request 302 to the messaging service 260 claiming a messaging address (e.g., an address or an identity name) that is unique to this messaging agent (e.g., a JID in XMPP or a SIP URI in SIP for instance). In some embodiments, the registration request comprises an address of the messaging service 260. In some embodiments, the messaging address may be static and may be hard-coded into the telecommunication product 210. In response to the registration request 302, the messaging service server 262 may transmit a registration confirmation 304 to the messaging agent 216 to confirm that the telecommunication product 210 is now registered with the messaging service 260. As previously discussed, in some embodiments, the registration mechanism of the messaging agent 216 with the messaging service 260 may be based on the extensible messaging and presence protocol (XMPP) and/or the session initiation protocol (SIP). As it may be appreciated by the person skilled in the art of the present technology, the registration of the messaging agent 216 is initiated from the first LAN 218 where the telecommunication product 210 is installed and therefore may be allowed by the Internet access gateway 222 without modifying the security policy of the Internet access gateway 222.

In a similar fashion, the messaging client 236 of the remote service center 230 may send a registration request 306 to the messaging service 260 claiming a messaging address that is unique to this messaging client (e.g., a JID in XMPP or a SIP URI in SIP for instance).

In some embodiments, the registration request comprises an address of the messaging service 260. In response to the registration request 306, the messaging service server 262 may transmit a registration confirmation 308 to the messaging client 236 to confirm that the telecommunication product 210 is now registered with the messaging service 260. The messaging client 236 may also be provisioned with the address of the messaging agent 216 so as to be able to reach out the telecommunication product 210.

Once both the messaging agent 216 and the messaging client 236 are registered with the messaging service 260, a connection path may be maintained permanently between the telecommunication product 210 and the remote service center 230 through the messaging service 262. As a result, the remote service center 230 may send messages to the telecommunication product 210 at any time and the telecommunication product 210 may respond to such messages.

Figure 4:
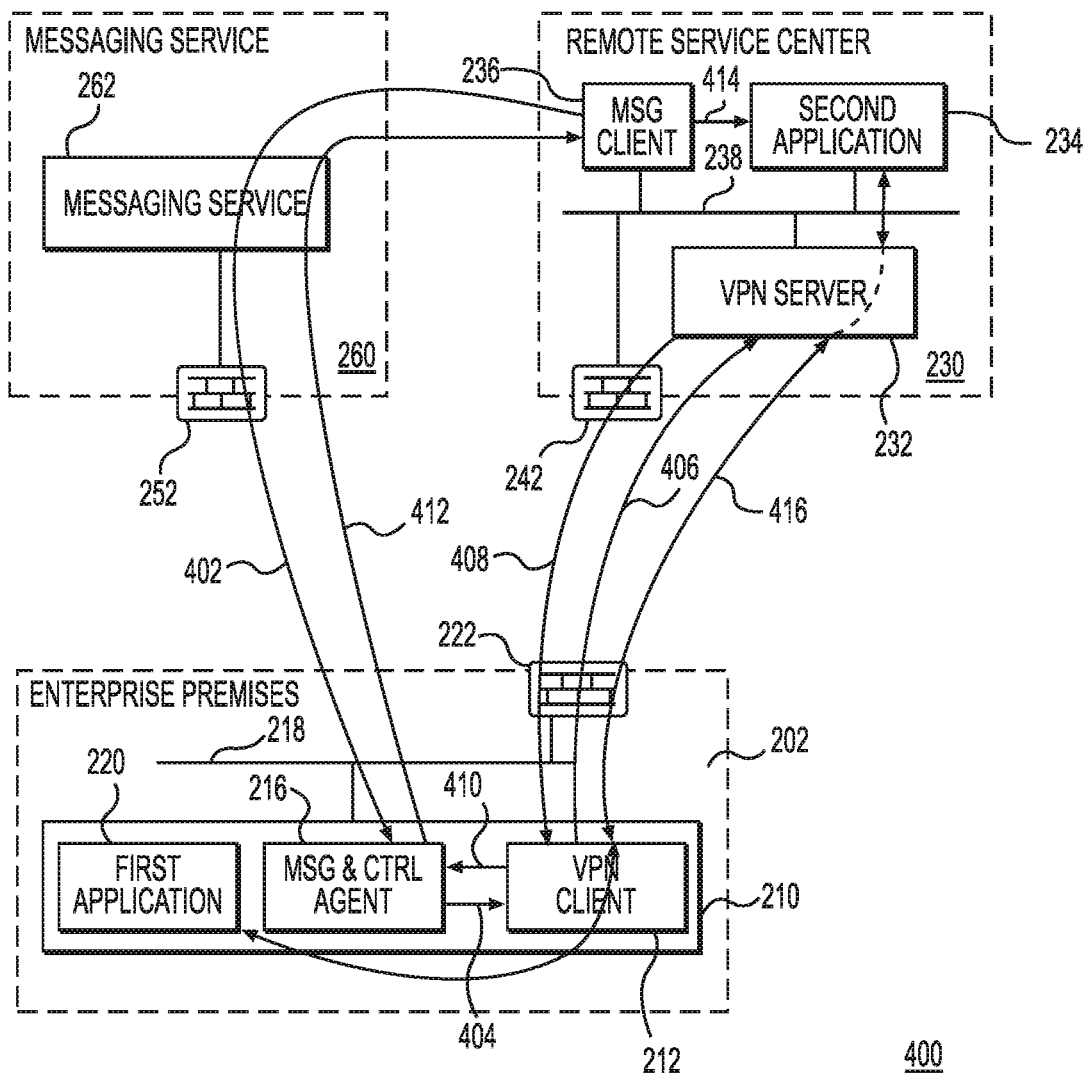
FIG. 4 is a diagram illustrating establishment of a connection in accordance with an embodiment of the present technology.

Turning now to FIG. 4, an example 400 of establishing a connection between the first application 220 running on the telecommunication product 210 and the second application 234 running on an electronic device of the remote service center 230 is illustrated. In some embodiments, the preliminary steps described in connection with the description of FIG. 3 may have been executed so as to allow the messaging agent 216 and the messaging client 236 to communicate to one another. In the illustrated embodiments, establishing the connection may start by the messaging client 236 sending a request message 402 to establish a VPN connection. In some embodiments, the connection to be established may be a packet connection, such as, but not limited to, a TCP/IP connection. The request message is sent to the messaging address of the messaging agent 216 through the messaging service 260. In some embodiments, the messaging agent 216 may have been configured to accept messages coming from pre-authorized messaging clients (such as, but not limited to, the messaging client 236). In some embodiments, accepting messages coming from pre-authorized messaging clients may be based on a messaging address and/or a unique identifier. Other variations may also be envisioned as it may become apparent to the person skilled in the art of the present technology. The request message 402 is received by the messaging agent 216. In some embodiments, the request message 402 comprises the address of the VPN server 232, credentials of the VPN server 232 and/or parameters of the VPN server 232. In some embodiments, the credentials may be a login, a password and/or a certificate. In some embodiments, the parameters may be an encryption algorithm. In some embodiments, a technician initiating the connection from the remote service center 230 may select the VPN server 232 from a plurality of VPN servers. The technician may also select the telecommunication product 210 she/he wishes to connect to from a plurality of telecommunication products installed at a given site or at a plurality of sites. In some embodiments, the connection is initiated so as to allow the second application 234 to access the telecommunication product 210. It should also be understood that a plurality of applications running on the remote service center 230 may also connect to one or more telecommunication products.

In the illustrated embodiment, the messaging agent 216, at a step 404, causes the VPN client 212 to negotiate, based on the request message, a VPN connection between the VPN client 212 and the VPN server 232. This may be achieved by the VPN client 212 sending a connection request 406 to the VPN server 232 to which the VPN server 232 responds by assigning a network address 408. The network address 408 is provisioned to the VPN client 212. In some embodiments, the network address 408 may be a virtual IP address. The virtual IP address may be from a domain associated with the VPN server 232. The VPN connection is then active and any messages (e.g., IP messages) may be sent to the allocated network address by being routed by the VPN connection. The messages may transit from the remote service center 230 to the telecommunication product 210 and vice-versa.

The messaging agent 216 may be informed, at a step 410, that the VPN connection has been successfully established. The messaging agent 216 may also be informed of the network address 408 that the VPN server 232 has allocated. At a step 412, the messaging agent 216 reports to the messaging client 236 that the VPN connection has been successfully established. In some embodiments, the messaging agent 216 also informs the messaging client 236 of the network address 408 assigned by the VPN server 232 for the VPN connection. The messaging client 236, at step 414, may command the second application 234 to set up a connection to the allocated network address 408. As previously discussed, the connection may be a TCP/IP connection. In some embodiments, commanding the second application 234 to set up the connection may be achieved by a command line interface used by the technician. In some alternative embodiments, an interface may automatically command the second application 234 to set up the connection. This step may also be completed manually, for example, by having the technician copying the network address from the messaging client 236 to the second application 234.

The second application 234 may then set up the connection and may communicate, at a step 416, with the first application 220. In some embodiments, the connection may be an IP connection. The second application 234 may therefore communicate with the telecommunication product 210 by sending IP packets to the virtual IP address. The IP packets may be routed by the VPN server 232 to the VPN client 212. The IP packets received by the telecommunication product 210 via the VPN connection may be processed as if they were sent to a regular IP address of the telecommunication product 210 (e.g., the IP address of the telecommunication product 210 within the first LAN 218).

Amongst multiple technical benefits, the above-described methods and systems may allow accessing a remote connection to the telecommunication product 210 while mitigating security issues. The above-described methods and systems may also allow a remote connection from the Internet to premises of an enterprise (e.g., an enterprise's LAN) without the burden of deploying a VPN server in the enterprise's premises. This may be achieved by relying on the VPN connection which allows sending packets to the virtual IP address only, which is then translated into the regular IP address of the telecommunication product 210. As a result, the telecommunication product 210 does not route any packets received from the VPN connection to the first LAN 218 thereby reducing the risk of remote intrusion to the first LAN 218 through the telecommunication product 210.

As it may also be appreciated by the person skilled in the art of the present technology, from the telecommunication product 210, the apparent end of the VPN connection is the Internet access gateway 242. As a result, the second LAN 238 may be hidden from the telecommunication product 210 and privacy of the second LAN 238 may be maintained.

Figure 5:
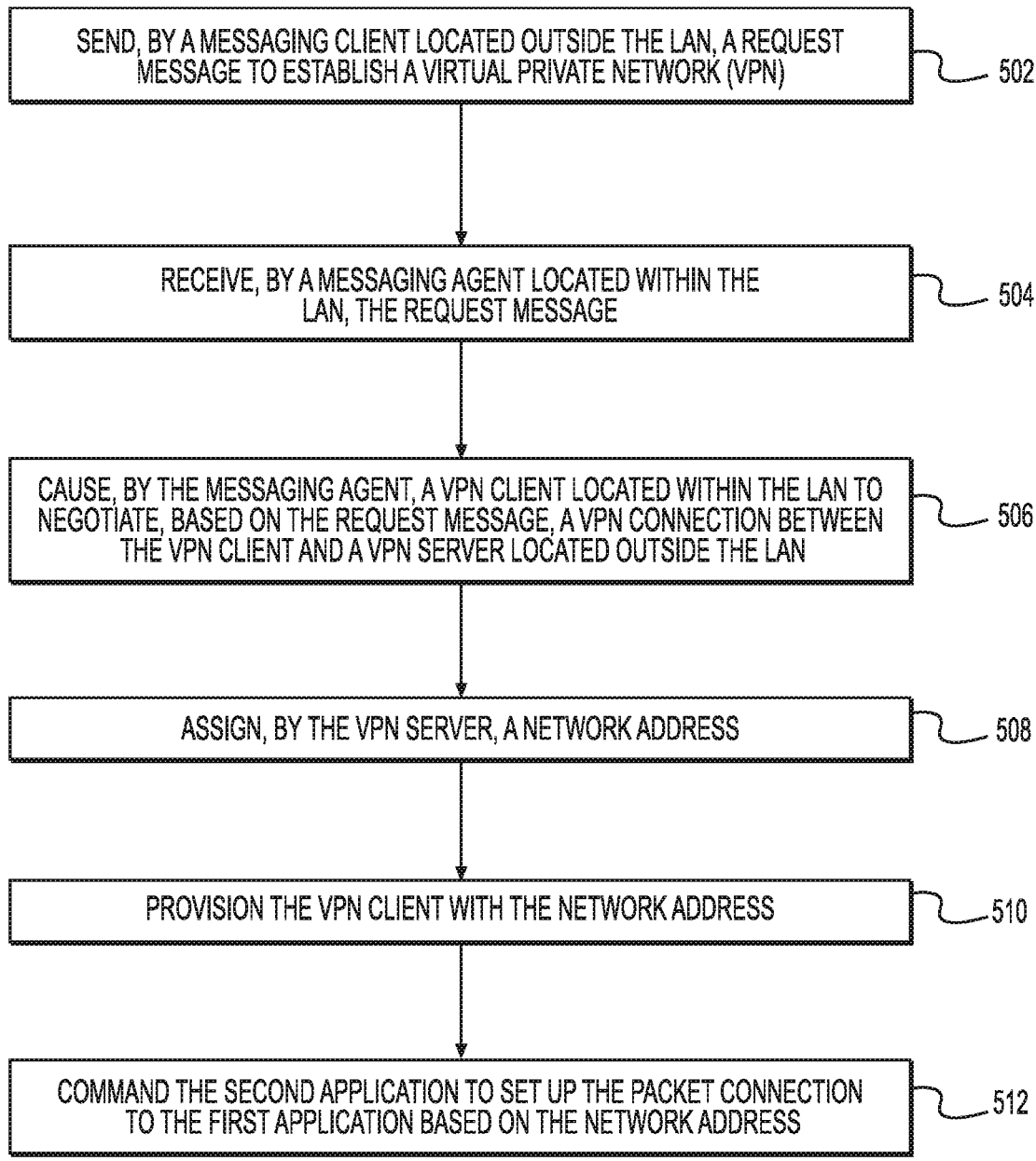
FIG. 5 is a diagram illustrating a flowchart illustrating a first computer-implemented method implementing embodiments of the present technology.

Turning now to FIG. 5, a flowchart illustrating a computer-implemented method 500 of establishing a packet connection between a first application running on a first electronic device located within a local area network (LAN) and a second application running on a second electronic device located outside the LAN is illustrated. In some embodiments, the computer-implemented method 500 may be (completely or partially) implemented on a computing environment similar to the computing environment 100 and/or 200, such as, but not limited to an environment comprising a telecommunication product and a remote service center. In some embodiments, the first electronic device is connected to the second electronic device via a wide area network (WAN). In some embodiments, the first electronic device is a telecommunication product and the second electronic device is part of a remote service center remote from a premise wherein the first electronic device is located, the packet connection allowing the second application to conduct remote maintenance operations or other remote applications on the first application.

The method 500 starts at step 502 by sending, by a messaging client located outside the LAN, a request message to establish a virtual private network (VPN). Then, at a step 504, the method 500 proceeds to receiving, by a messaging agent located within the LAN, the request message. In some embodiments, the messaging agent comprises a messaging client and logic to initiate the connection by the VPN client to the VPN server based on the network address. In some embodiments, the messaging client and the message agent comprises instructions to operate a light weight messaging service compliant with at least one of the extensible messaging and presence protocol (XMPP) and the session initiation protocol (SIP). In some embodiments, the messaging agent, the first application and the VPN client run on the first electronic device. In some embodiments, the packet connection is a TCP/IP connection and the network address is a virtual IP address.

At a step 506, the method 500 executes causing, by the messaging agent, a VPN client located within the LAN to negotiate, based on the request message, a VPN connection between the VPN client and a VPN server located outside the LAN. In some embodiments, the request message comprises at least one of an address of the VPN server, VPN credentials and VPN parameters.

At a step 508, the method 500 proceeds to assigning, by the VPN server, a network address. In some embodiments, the network address is from a domain associated with the second application.

The method 500 then, at a step 510, provisions the VPN client with the network address. Then, at a step 512, the method 500 proceeds to commanding the second application to set up the packet connection to the first application based on the network address. In some embodiments, the step 512 is executed by the messaging client. In some embodiments, the step 512 comprises setting up, by the second application, the packet connection to the first application so as to communicate with the first application by sending packets to the network address.

In some embodiments, prior to commanding the second application to set up the packet connection to the first application based on the network address, the method 500 comprises a step of receiving, by the messaging agent, a confirmation of an establishment of the VPN connection and the network address and a step of sending, by the messaging agent, to the messaging client the confirmation of the establishment of the VPN connection and the network address. In some embodiments, the packets are routed by the VPN server to the VPN client.

Figure 6:
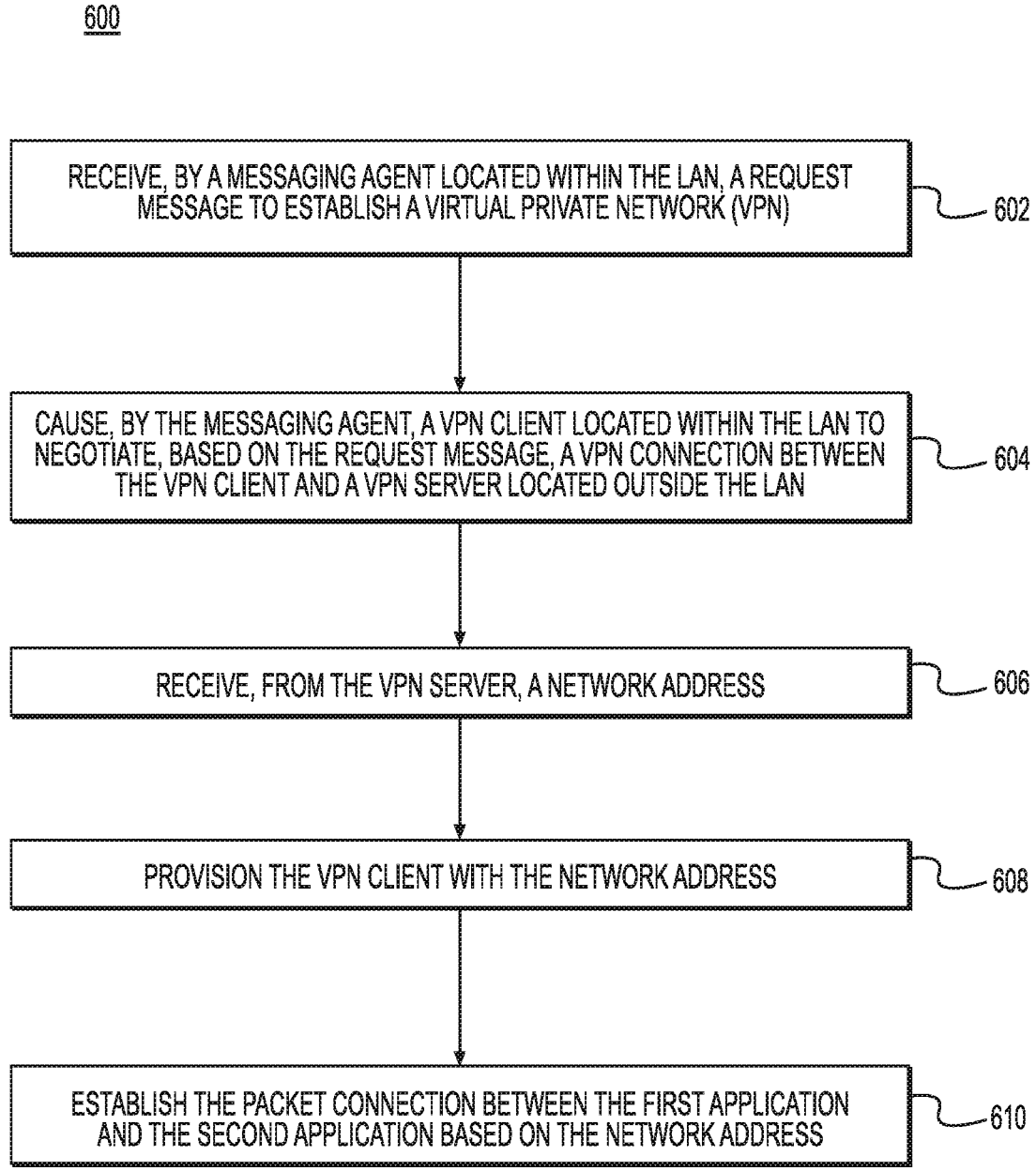
FIG. 6 is a diagram illustrating a flowchart illustrating a second computer-implemented method implementing embodiments of the present technology.

Turning now to FIG. 6, a flowchart illustrating a computer-implemented method 600 of establishing a packet connection between a first application running on a first electronic device located within a local area network (LAN) and a second application running on a second electronic device located outside the LAN is illustrated. In some embodiments, the computer-implemented method 600 may be (completely or partially) implemented on a computing environment similar to the computing environment 100, such as, but not limited to an environment comprising a telecommunication product.

The method 600 starts at a step 602 by receiving, by a messaging agent located within the LAN, a request message to establish a virtual private network (VPN). In some embodiments, the request message comprises at least one of an address of the VPN server, VPN credentials and VPN parameters. In some embodiments, the messaging agent comprises a messaging client and logic to initiate the connection by the VPN client to the VPN server based on the network address. In some embodiments, the messaging agent comprises instructions to operate a light weight messaging service compliant with at least one of the extensible messaging and presence protocol (XMPP) and the session initiation protocol (SIP). In some embodiments, the messaging agent, the first application and the VPN client run on the first electronic device.

Then, at a step 604, the method 600 proceeds to causing, by the messaging agent, a VPN client located within the LAN to negotiate, based on the request message, a VPN connection between the VPN client and a VPN server located outside the LAN.

At a step 606, the method 600 executes receiving, from the VPN server, a network address. In some embodiments, the step 606 comprises at step of receiving, by the messaging agent, a confirmation of an establishment of the VPN connection and the network address and a step of sending, by the messaging agent, to a messaging client located outside the LAN the confirmation of the establishment of the VPN connection and the network address. In some embodiments, the packet connection is a TCP/IP connection and the network address is a virtual IP address.

Then, at a step 608, the method 600 proceeds to provisioning the VPN client with the network address. At a step 610, the method 600 establishes the packet connection between the first application and the second application based on the network address.

Figure 7:
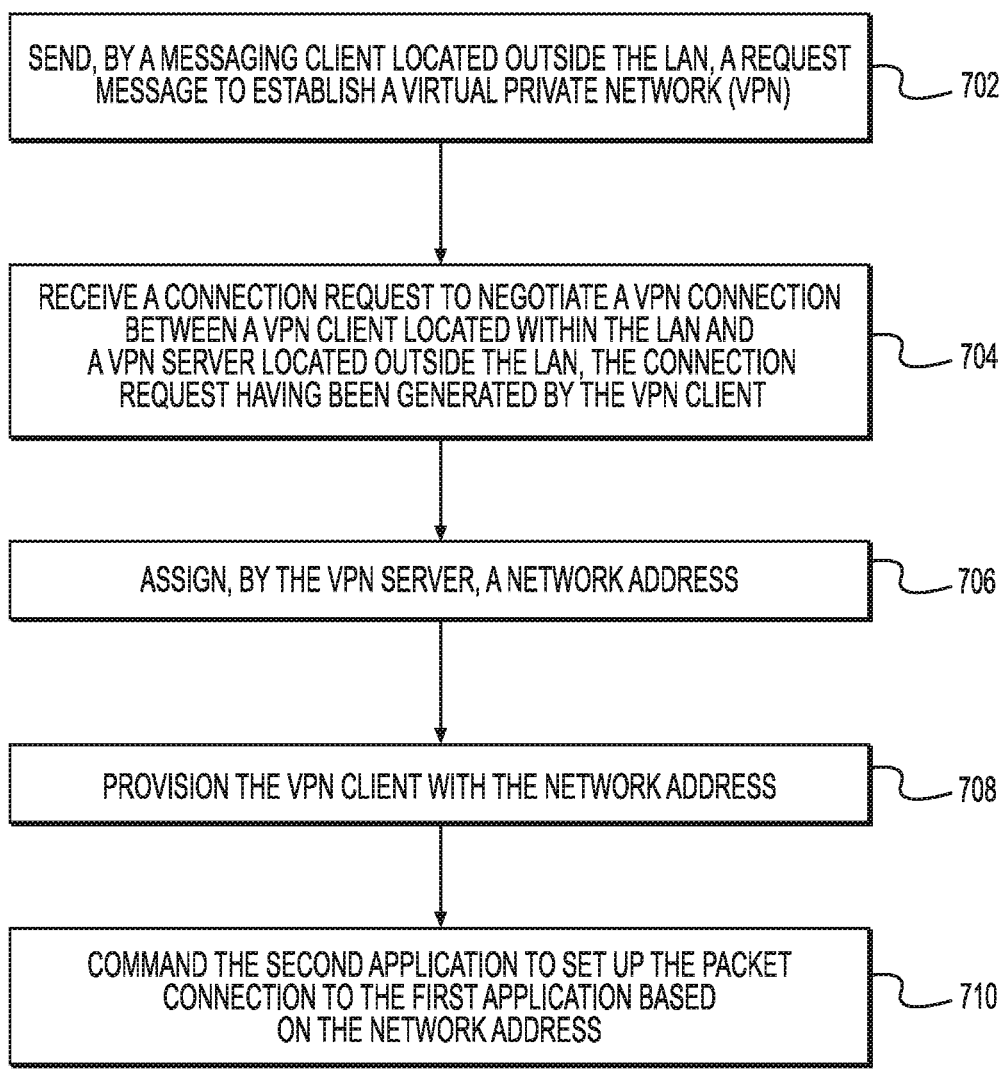
FIG. 7 is a diagram illustrating a flowchart illustrating a third computer-implemented method implementing embodiments of the present technology.

Turning now to FIG. 7, a flowchart illustrating a computer-implemented method 700 of establishing a packet connection between a first application running on a first electronic device located within a local area network (LAN) and a second application running on a second electronic device located outside the LAN is illustrated. In some embodiments, the computer-implemented method 700 may be (completely or partially) implemented on a computing environment similar to the computing environment 100, such as, but not limited to an environment comprising a remote service center.

The method 700 starts at a step 702 by sending, by a messaging client located outside the LAN, a request message to establish a virtual private network (VPN). In some embodiments, the request message comprises at least one of an address of the VPN server, VPN credentials and VPN parameters. In some embodiments, the messaging client comprises instructions to operate a light weight messaging service compliant with at least one of the extensible messaging and presence protocol (XMPP) and the session initiation protocol (SIP).

Then, at a step 704, the method 700 proceeds to receiving a connection request to negotiate a VPN connection between a VPN client located within the LAN and a VPN server located outside the LAN, the connection request having been generated by the VPN client.

At a step 706, the method 700 executes assigning, by the VPN server, a network address. Then, at a step 708, the method 700 proceeds to provisioning the VPN client with the network address. At a step 710, the method 700 executes commanding the second application to set up the packet connection to the first application based on the network address. In some embodiments, the step 710 is executed by the messaging client. In some embodiments, the step 710 comprises setting up, by the second application, the packet connection to the first application so as to communicate with the first application by sending packets to the network address. In some embodiments, the method 700 causes routing the packets by the VPN server to the VPN client. In some embodiments, the network address is from a domain associated with the second application. In some embodiments, the packet connection is a TCP/IP connection and the network address is a virtual IP address.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method of establishing a packet connection between a first application running on a first electronic device located within a local area network (LAN) and a second application running on a second electronic device located outside the LAN, the method comprising:

sending, by a messaging agent located within the LAN, a first registration request to a messaging service;
receiving, by the messaging agent and in response to the first registration request, a first registration confirmation;
sending, by a messaging client located outside of the LAN, a second registration request to the messaging service;
receiving, by the messaging client and in response to the second registration request, a second registration confirmation;
sending, by the messaging client and through the messaging service, a request message to establish a virtual private network (VPN);
receiving, by the messaging agent and through the messaging service, the request message;
causing, by the messaging agent, a VPN client located within the LAN to negotiate, based on the request message, a VPN connection between the VPN client and a VPN server located outside the LAN;
assigning, by the VPN server, a network address;
provisioning the VPN client with the network address;
receiving, by the messaging agent, a confirmation of an establishment of the VPN connection and the network address;
sending, by the messaging agent and to the messaging client, the confirmation of the establishment of the VPN connection and the network address; and
commanding the second application to set up the packet connection to the first application based on the network address.

2. The method of claim 1, wherein commanding the second application to set up the packet connection to the first application based on the network address is executed by the messaging client.

3. The method of claim 1, wherein commanding the second application to set up the packet connection to the first application based on the network address comprises setting up, by the second application, the packet connection to the first application so as to communicate with the first application by sending packets to the network address.

4. The method of claim 3, wherein the packets are routed by the VPN server to the VPN client.

5. The method of claim 1, wherein the request message comprises at least one of an address of the VPN server, VPN credentials and VPN parameters.

6. The method of claim 1, wherein the network address is from a domain associated with the second application.

7. The method of claim 1, wherein the messaging agent comprises a messaging client and logic to initiate the connection by the VPN client to the VPN server based on the network address.

8. The method of claim 1, wherein the messaging client and the messaging agent comprises instructions to operate a light weight messaging service allowing maintaining a communication path between the messaging client and the messaging agent.

9. The method of claim 1, wherein the messaging agent, the first application and the VPN client run on the first electronic device.

10. The method of claim 1, wherein the packet connection is a TCP/IP connection and the network address is a virtual IP address.

11. A computer-implemented method of establishing a packet connection between a first application running on a first electronic device located within a local area network (LAN) and a second application running on a second electronic device located outside the LAN, the method comprising:
sending, by a messaging agent located within the LAN, a first registration request to a messaging service;
receiving, by the messaging agent and in response to the first registration request, a first registration confirmation;
sending, by a messaging client located outside of the LAN, a second registration request to the messaging service;
receiving, by the messaging client and in response to the second registration request, a second registration confirmation;
sending, by the messaging client and through the messaging service, a request message to establish a virtual private network (VPN);
receiving, by the messaging agent and through the messaging service, the request message;
causing, by the messaging agent, a VPN client located within the LAN to negotiate, based on the request message, a VPN connection between the VPN client and a VPN server located outside the LAN;
receiving, from the VPN server, a network address;
provisioning the VPN client with the network address;
receiving, by the messaging agent, a confirmation of an establishment of the VPN connection and the network address;
sending, by the messaging agent and to the messaging client, the confirmation of the establishment of the VPN connection and the network address; and
establishing the packet connection between the first application and the second application based on the network address.

12. The method of claim 11, wherein the request message comprises at least one of an address of the VPN server, VPN credentials and VPN parameters.

13. The method of claim 11, wherein the messaging agent comprises a messaging client and logic to initiate the connection by the VPN client to the VPN server based on the network address.

14. The method of claim 13, wherein the messaging agent comprises instructions to operate a light weight messaging service allowing maintaining a communication path between the messaging client and the messaging agent.

15. The method of claim 11, wherein the messaging agent, the first application and the VPN client run on the first electronic device.

16. The method of claim 11, wherein the packet connection is a TCP/IP connection and the network address is a virtual IP address.

17. A computer-implemented method of establishing a packet connection between a first application running on a first electronic device located within a local area network (LAN) and a second application running on a second electronic device located outside the LAN, the method comprising:
sending, by a messaging agent located within the LAN, a first registration request to a messaging service;
receiving, by the messaging agent and in response to the first registration request, a first registration confirmation;
sending, by a messaging client located outside of the LAN, a second registration request to the messaging service;

receiving, by the messaging client and in response to the second registration request, a second registration confirmation;

sending, by the messaging client and through the messaging service, a request message to establish a virtual private network (VPN);

receiving, through the messaging service, a connection request to negotiate a VPN connection between a VPN client located within the LAN and a VPN server located outside the LAN, the connection request having been generated by the VPN client;

assigning, by the VPN server, a network address;

provisioning the VPN client with the network address;

receiving, by the messaging agent, a confirmation of an establishment of the VPN connection and the network address;

sending, by the messaging agent and to the messaging client, the confirmation of the establishment of the VPN connection and the network address; and commanding the second application to set up the packet connection to the first application based on the network address.

18. The method of claim 17, wherein commanding the second application to set up the packet connection to the first application based on the network address is executed by the messaging client.

19. The method of claim 17, wherein commanding the second application to set up the network connection to the first application based on the network address comprises setting up, by the second application, the packet connection to the first application so as to communicate with the first application by sending packets to the network address.

20. The method of claim 19, comprising routing the packets by the VPN server to the VPN client.

21. The method of claim 17, wherein the request message comprises at least one of an address of the VPN server, VPN credentials and VPN parameters.

22. The method of claim 17, wherein the messaging client comprises instructions to operate a light weight messaging service compliant with at least one of the extensible messaging and presence protocol (XMPP) and the session initiation protocol (SIP).

23. The method of claim 17, wherein the packet connection is a TCP/IP connection and the network address is a virtual IP address.

24. A system for establishing a packet connection between a first application running on a first electronic device located within a local area network (LAN) and a second application running on a second electronic device located outside the LAN, the system comprising:
a processor;
a non-transitory computer-readable medium, the non-transitory computer-readable medium comprising control logic which, upon execution by the processor, causes:
sending, by a messaging agent located within the LAN, a first registration request to a messaging service;
receiving, by the messaging agent and in response to the first registration request, a first registration confirmation;
sending, by a messaging client located outside of the LAN, a second registration request to the messaging service;

receiving, by the messaging client and in response to the second registration request, a second registration confirmation;

sending, by the messaging client and through the messaging service, a request message to establish a virtual private network (VPN);

receiving, by the messaging agent and through the messaging service, the request message;

causing, by the messaging agent, a VPN client located within the LAN to negotiate, based on the request message, a VPN connection between the VPN client and a VPN server located outside the LAN;

receiving, from the VPN server, a network address;

provisioning the VPN client with the network address;

receiving, by the messaging agent, a confirmation of an establishment of the VPN connection and the network address;

sending, by the messaging agent and to the messaging client, the confirmation of the establishment of the VPN connection and the network address; and establishing the packet connection between the first application and the second application based on the network address.

25. A system for establishing a packet connection between a first application running on a first electronic device located within a local area network (LAN) and a second application running on a second electronic device located outside the LAN, the system comprising:
a processor;
a non-transitory computer-readable medium, the non-transitory computer-readable medium comprising control logic which, upon execution by the processor, causes:
sending, by a messaging agent located within the LAN, a first registration request to a messaging service;
receiving, by the messaging agent and in response to the first registration request, a first registration confirmation;
sending, by a messaging client located outside of the LAN, a second registration request to the messaging service;
receiving, by the messaging client and in response to the second registration request, a second registration confirmation;
sending, by the messaging client and through the messaging service, a request message to establish a virtual private network (VPN);
receiving a connection request to negotiate a VPN connection between a VPN client located within the LAN and a VPN server located outside the LAN, the connection request having been generated by the VPN client;
assigning, by the VPN server, a network address;
provisioning the VPN client with the network address;
receiving, by the messaging agent, a confirmation of an establishment of the VPN connection and the network address;
sending, by the messaging agent and to the messaging client, the confirmation of the establishment of the VPN connection and the network address; and
commanding the second application to set up the packet connection to the first application based on the network address.

* * * * *